US009183529B2

(12) United States Patent
Gluzman Peregrine et al.

(10) Patent No.: US 9,183,529 B2
(45) Date of Patent: Nov. 10, 2015

(54) BUSINESS INTELLIGENCE PERFORMANCE ANALYSIS SYSTEM

(75) Inventors: Vladimir Gluzman Peregrine, Chesnut Hill, MA (US); John Benjamin Popp, Charlestown, MA (US); Leigh Ishikawa, Dover, MA (US); Jason Furtado, Boston, MA (US); Spiro Michaylov, Kirkland, WA (US); Richard Lawrence Albright, Medford, MA (US); Mohammad Haque, Boston, MA (US); Tianyu Zhu, Ottawa (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 726 days.

(21) Appl. No.: 13/564,192

(22) Filed: Aug. 1, 2012

(65) Prior Publication Data

US 2014/0040306 A1    Feb. 6, 2014

(51) Int. Cl.
  *G06F 17/11* (2006.01)
  *G06F 17/30* (2006.01)
  *G06Q 10/06* (2012.01)
  *G06F 11/34* (2006.01)
  *G06Q 10/10* (2012.01)

(52) U.S. Cl.
  CPC ........ *G06Q 10/0639* (2013.01); *G06F 11/3409* (2013.01); *G06F 17/30551* (2013.01); *G06Q 10/10* (2013.01); *G06F 2201/80* (2013.01)

(58) Field of Classification Search
  CPC ................................ G06F 17/30536
  See application file for complete search history.

(56) References Cited

U.S. PATENT DOCUMENTS

| | | | |
|---|---|---|---|
| 8,041,652 B2 | 10/2011 | Barkai et al. | |
| 2003/0088546 A1* | 5/2003 | Brown et al. | 707/3 |
| 2006/0026179 A1* | 2/2006 | Brown et al. | 707/100 |
| 2007/0136234 A1* | 6/2007 | Levin et al. | 707/2 |
| 2008/0163066 A1* | 7/2008 | Gu et al. | 715/738 |
| 2009/0019092 A1* | 1/2009 | Dettinger et al. | 707/202 |
| 2009/0125482 A1 | 5/2009 | Peregrine et al. | |
| 2010/0146110 A1 | 6/2010 | Christensen et al. | |
| 2011/0153796 A1 | 6/2011 | Branson | |
| 2011/0282847 A1* | 11/2011 | Collins et al. | 707/688 |
| 2012/0124032 A1 | 5/2012 | Zelevinsky et al. | |
| 2012/0144326 A1* | 6/2012 | Werner | 715/763 |

OTHER PUBLICATIONS

Endeca, "Endeca Latitude: Simplicity of Search with the Power of BI", pp. 1-2, Copyright 2011.
Endeca, "Endeca Latitude Technical Overview", pp. 1-18, Copyright 2010.

* cited by examiner

*Primary Examiner* — James E Richardson
(74) *Attorney, Agent, or Firm* — Miles & Stockbridge P.C.

(57) ABSTRACT

A performance analysis system that analyzes the performance of a business intelligence analytics application is provided. The performance analysis system logs data associated with one or more queries of a database within the database. The performance analysis system further generates performance data based on an analysis of the logged data, where the performance data includes data associated with one or more performance metrics of each query. The performance analysis system further generates one or more performance queries of the performance data, where a response to each performance query includes at least a portion of the one or more performance metrics stored within the database.

20 Claims, 5 Drawing Sheets

BUSINESS INTELLIGENCE PERFORMANCE ANALYSIS SYSTEM

FIELD

One embodiment is directed to a computer system, and more particularly, to a computer system that processes business intelligence analytics data.

BACKGROUND

Business intelligence is defined as the ability for an organization to take all its capabilities and convert them into knowledge, ultimately getting the right information to the right person at the right time via the right channel. Business intelligence analytic applications provide information technology professionals the power to bring together diverse data, resulting in better alignment with the information technology professional's business, and a more agile information technology organization. Furthermore, business professions can gain access to various types of information they need using business intelligence analytic applications, in addition to freedom to explore the information in an unconstrained and intuitive manner using advanced search visualizations. Business intelligence analytic applications can provide support for guided exploration, search, and analysis on any kind of information: structured, semi-structured or unstructured data, either from inside an organization or from external services.

SUMMARY

One embodiment is directed to a performance analysis system that analyzes a performance of a business intelligence analytics application. The performance analysis system receives one or more queries from one or more users of the business intelligence analytics application, where a response to each query includes one or more attributes stored within a database, and where each query is associated with a user, a modular component, and an action. The performance analysis system further, for each query that is executed against the database, logs data associated with the query within the database, where the logged data includes the user, the modular component, and the action. The performance analysis system further generates performance data based on an analysis of the logged data, where the performance data includes data associated with one or more performance metrics of each query of the one or more queries, and wherein the performance data is stored within one of the database or a second database. The performance analysis system further generates one or more performance queries of the performance data, where a response to each performance query includes at least a portion of the one or more performance metrics stored within the database.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 3 illustrates an example user interface of a performance analysis system, according to an embodiment of the invention.

DETAILED DESCRIPTION

According to an embodiment, logged data within a search-analytical database can be analyzed, and performance data can be generated based on the logged data, where the performance data indicates the performance of the search-analytical database based on one or more queries generated by a business intelligence application. The performance data can be integrated to a particular user action within the business intelligence application. The integrated performance data can identify performance bottlenecks and provide a holistic characterization of the performance of the business intelligence application and search-analytical database. The integrated performance data can reveal sources of latency and performance hotspots. As described in this specification, a "computer application," "software application," or "application" is any collection of computer programs and/or modules. Furthermore, the integrated performance data could be used to re-execute one or more queries that have been previously executed and recorded against actual data. The re-execution of the one or more queries can provide performance data that cannot be ascertained from the logged data, such as number of dimensions and results that are returned, and resources consumed during query processing.

Known business intelligence systems can log data, and produce pre-defined performance metrics, based on metrics that a user has previously identified. However, known business intelligence systems generally do not allow a user to assess performance based on metrics that the user has not previously identified. Furthermore, known performance analysis tools are generally designed to increase user traffic, rather than identify and address performance bottlenecks. Furthermore, known business intelligence systems generally require a user to define a specific tool to analyze logged data, and generally do not provide a framework to automatically generate and deliver performance metric data to the user. Furthermore, known business intelligence systems generally do not allow a user to analyze performance in the context of original data. Instead, in known systems, performance analysis is generally performed in special "test" environments.

According to an embodiment, in contrast with known business intelligence systems, a performance analysis application can be operably integrated with a search-analytical database. In test scenarios, or in production scenarios with "live" data, logging capabilities of the search-analytical database can be initiated. During normal operation, or during specifically-defined "test" operations, the logging capabilities of the search-analytical database can log data. In certain embodiments, a second instance of the search-analytical database can be used to analyze the logged data, and interactively provide a view as to the performance of the search-analytical database. In other embodiments, the original instance of the search-analytical database can be used to analyze the logged data, at the same time that the search-analytical database provides functionality to one or more business intelligence applications. For example, the search-analytical database can provide functionality to an electronic commerce application, where a user of the electronic commerce application can query the search-analytical database looking for t-shirts with specific colors. While the search-analytical database processes the user's queries, and returns results, an administrator can perform one or more performance-related queries, with both actions occurring in parallel in the same search-analytical database instance. The performance analysis application can analyze a series of data points (with some of the data points being the logged data within the search-analytical database), and, based on the analysis, the performance analysis application can produce a composite performance analysis that can be displayed to a user.

Figure 1:
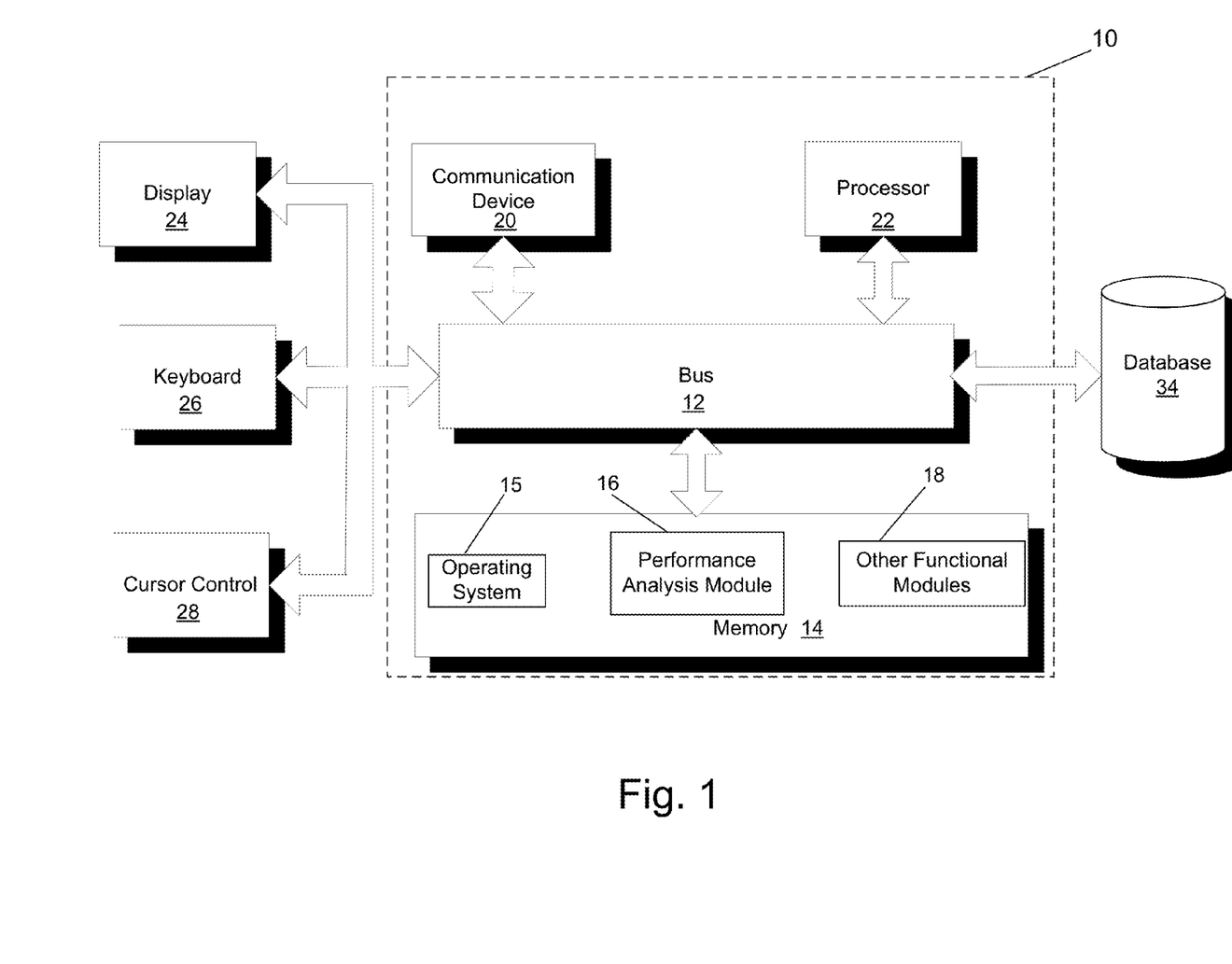
FIG. 1 illustrates a block diagram of a performance analysis system that can implement an embodiment of the invention.

FIG. 1 illustrates a block diagram of a performance analysis system 10 that can implement one embodiment of the invention. Performance analysis system 10 includes a bus 12 or other communications mechanism for communicating information between components of system 10. Performance analysis system 10 also includes a processor 22, operatively coupled to bus 12, for processing information and executing instructions or operations. Processor 22 may be any type of general or specific purpose processor. Performance analysis system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Performance analysis system 10 further includes a communication device 20, such as a network interface card or other communications interface, to provide access to a network. As a result, a user may interface with performance analysis system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with performance analysis system 10.

According to one embodiment, memory 14 can store software modules that may provide functionality when executed by processor 22. The modules can include an operating system 15, a performance analysis module 16, as well as other functional modules 18. Operating system 15 can provide an operating system functionality for performance analysis system 10. Performance analysis module 16 can provide functionality for analyzing a performance of a business intelligence analytics application, as will be described in more detail below. In certain embodiments, performance analysis module 16 can comprise a plurality of modules, where each module provides specific individual functionality for analyzing a performance of a business intelligence analytics application. Performance analysis system 10 can also be part of a larger system. Thus, performance analysis system 10 can include one or more additional functional modules 18 to include the additional functionality. For example, functional modules 18 may include modules that provide additional functionality, such as the "Latitude" business intelligence platform from Oracle Corp.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
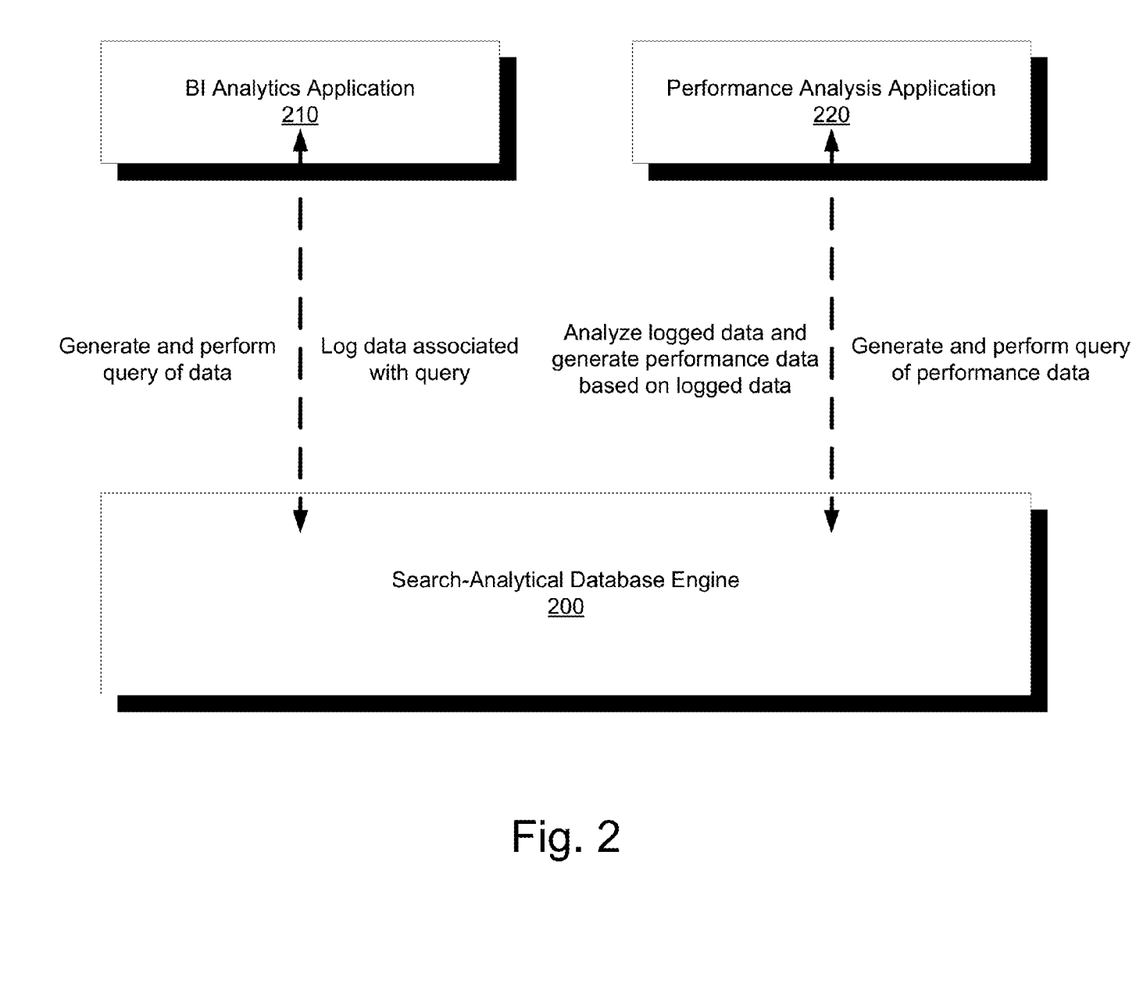
FIG. 2 illustrates another block diagram of a performance analysis system, according to an embodiment of the invention.

FIG. 2 illustrates another block diagram of a performance analysis system, according to an embodiment of the invention. According to the embodiment, the performance analysis system includes a search-analytical database engine 200. Search-analytical database engine 200 is a hybrid search-analytical database that provides support for guided exploration, search, and analysis on structured data, semi-structured data, or unstructured data. Search-analytical database engine 200 can be a vertical record store, where data is stored in a columnar format. Search-analytical database engine 200 stores each column of data on a combination of disk and memory in two sort orders: by value and also by a universal record key identifier. Each column of search-analytical database engine 200 contains a tree-structured index that is cached in memory. In alternate embodiments, the performance analysis system can include additional databases in addition to search-analytical database engine 200 (not shown in FIG. 2), where some or all of the additional databases are hybrid search-analytical databases. In one embodiment, search-analytical database engine 200 is implemented by database 34 of FIG. 1.

According to the embodiment, search-analytical database engine 200 can include a single table that includes a plurality of records, where each record has its own self-describing schema. For example, a first record can include a primary key and a value, whereas a second record can include a primary key, six secondary keys, fifteen different column values, and link to external content. Search-analytical database engine 200 can receive one or more query requests, and, in response, can perform one or more queries to retrieve one or more sets of records. The data contained in the one or more sets of records can be "ragged." In other words, certain columns of the table that are returned can include data, and other columns of the table that are returned may not include data. A query can ask for certain columns of the table. In response to a query, search-analytical database engine 200 can recommend other columns of the table to add to query to refine data results.

Search-analytical database engine 200 can accommodate any type of data, including structured data, semi-structured data, and unstructured data. Search-analytical database engine 200 can process and respond to a plurality of queries in sub-second intervals, and can accommodate additions, subtractions, and changes in one or more data sources. Search-analytical database engine 200 can utilize a faceted data model, where there is no overarching schema for the data, and, instead, every record includes its own schema. Thus, search-analytical database engine 200 can automatically identify a relationship between records based on one or more shared attributes through indexing of specific data attributes. Once data is loaded within search-analytical database engine

200, search-analytical database engine 200 can derive common dimensions and metrics from available metadata associated with the data, exposing the data for high-performance refinement and analysis as is described below in greater detail.

Search-analytical database engine 200 can support searches, queries, filters, and analytics. Regarding searches, search-analytical database engine 200 can support text-based searches of the data stored within search-analytical database engine 200. Such text-based searches can include positional searches, Boolean searches, wildcard searches, natural language searches, category searches, and query clarification dialog searches. Such text-bases searches can further include exploratory searches that allow users to clarify what is relevant through refinements and summaries of original text-based searches. In addition, such text-based searches can include functionality such as type-ahead functionality and automatic alpha-numeric spell correction functionality. Further, search-analytical database engine 200 can support a cascading relevance display of search results, where results are sorted by a primary relevance strategy, and ties are broken with a secondary strategy, and so on. Search-analytical database engine 200 can also support set searches, where groups of results are returned as well as the relationship of each individual result to the set. Search-analytical database engine 200 can also support second-order relevance, where additional terms are provided that most effectively refine search results.

Regarding queries and filters, search-analytical database engine 200 supports a wide range of queries and filters that can operate across structured, semi-structured, and unstructured data, such as navigation, interactive visualizations, analytics, range filters, geospatial filters and other query types commonly associated with business intelligence applications. Search-analytical database engine 200 can provide query result sets that are summarized, which can give users guidance on how to refine and explore further. Such summaries can include faceted search results, maps, charts, graphs, tag clouds, concept clusters, and clarification dialogs. These summaries are not explicitly asked for by the user. Instead, search-analytical database engine 200 can provide these summaries based on metadata associated with the requested data stored within search-analytical database engine 200.

Regarding analytics, search-analytical database engine 200 can provide an analytic language that allows users to explore aggregate and statistical views of large volumes of data. Search-analytical database engine 200 can also support working with a variety of data types including numerical and date/time values that allow applications to work with temporal data, performing time-based sorting, filtering and analysis. Analytics can be written using a structured query language that is supported by search-analytical database engine 200. The structured query language can allow analytical visualizations that update dynamically as a user refines a current search and navigation query. Further, analytics results support click-through to underlying record details, enabling users to refine their navigation state directly from a view of their analytics sub-query results. Thus, the structured query language supports the computation of a set of analytics on records stored within search-analytical database engine 200, and in particular on the results of navigation, search and other analytics operations. The structured query language includes support for a wide variety of capabilities including the following: aggregation functions; numeric functions; composite expressions to construct complex derived functions; grouped aggregations such as cross-tabulated totals over one or more dimensions; top-k according to an arbitrary function; cross-grouping comparisons such as time period comparisons; intra-aggregate comparisons such as computation of the percentage contribution of one region of the data to a broader subtotal; and compositions of the above-mentioned features.

According to the embodiment, the performance analysis system further includes a business intelligence analytics application 210. Business intelligence analytics application 210 is an application that can operably connect to search-analytical database engine 200, and can allow one or more users to explore the data stored within search-analytical database engine 200. Such exploration can include text-based searches, queries, filters, and analytics. Thus, one or more users can explore a plurality of attributes contained within the data of search-analytical database engine 200. Business intelligence analytics application 210 further displays the data, and allows one or more users to analyze and further refine the data. Such data displays can include charts, tables, cross tabs, metrics bars, tag clouds, and maps. Thus, one or more users can create one or more summarizations of the data stored within search-analytical database engine 200. For example, business intelligence analytics application 210 can be deployed in an auto manufacturing environment for an auto manufacturer that performs warranty analysis (e.g., analyzes what components of car breaks down, which assembly location produces the best quality of products, etc.). Users of business intelligence analytics application 210 can select all the cars manufactured that have a color of red, can select all the cars that are manufactured in Buffalo, can have both summarizations displayed within a page, can pivot each summarization (e.g., sort by plant, rather than by car model), and can type in a text search based on the summarizations (e.g., search for "air conditioner"). In alternate embodiments, the performance analysis system can include additional business intelligence analytics applications in addition to business intelligence analytics application 210 (not shown in FIG. 2), where the additional business intelligence analytics applications provide identical or substantially similar functionality as business intelligence analytics application 210.

Business intelligence analytics application 210 can include a plurality of modular components that the user interacts with to explore data stored within search-analytical database engine 200 and to analyze data displayed within business intelligence analytics application 210. For example, business intelligence analytics application 210 can include a modular component configured to provide a navigation panel (identified as a navigation component). The navigation component can allow a user to perform a text search of data stored within search-analytical database engine 200, can display attribute selections that have previously been made, as well as display potential attribute selections that can be made in the future, and can also display text filters that have been applied. In this example, business intelligence analytics application 210 can also include a modular component that displays what selections have been made (identified as a breadcrumb component). Business intelligence analytics application 210 can also include a modular component that displays a sampling of records retrieved from search-analytical database engine 200 (identified as a record component). Business intelligence analytics application 210 can also include a modular component that summarizes data retrieved from search-analytical data engine 200 in one or more views, such as one or more charts (identified as a summarization component). According to the embodiment, a user can initiate one or more queries on data stored within search-analytical database engine 200 from one of the plurality of modular components of business intelligence analytics application 210, and the one or more queries can be associated with the modular component.

Further, during an interaction with business intelligence analytics application 210, a user can perform one or more actions (such as requesting a summarization or requesting a set of summarizations), where an action can be initiated by one or more gestures performed within a user interface of business intelligence analytics application 210. Each action can cause the initiation of one or more queries of data stored within search-analytical database engine 200, and the one or more queries can be associated with the action. Each action can be associated with a type, where a type is a grouping of one or more actions. Furthermore, each action can include intrinsic data, which can be metadata that describes where the user is within business intelligence analytics application 210 (such as what selections the user has made, what text selection the user has created, or what summarization the user is currently viewing). Furthermore, a user's interaction with business intelligence analytics application 210, from beginning to end, can be defined as a user session, where a user session can include one or more actions. Each user session can cause the initiation of one or more queries of data stored within search-analytical database engine 200, and the one or more queries can be associated with the user session.

According to the embodiment, one or more users of business intelligence analytics application 210 can query data stored within search-analytical database engine 200 through one or more queries. The one or more queries can be created by business intelligence analytics application 210. Each query of the one or more queries can be associated with an action performed by a user. Thus, an action can include one or more queries. Further, each action of the one or more actions can be associated with a user session of the user. Thus, a user session can include one or more actions. In certain embodiments, user session information can be inherited by an action, and user session information and action information can be inherited by a query. Further, each query of the one or more queries can originate from a modular component of business intelligence analytics application 210, where the business intelligence analytics application 210 can include one or more modular components. Thus, each query of the one or more queries can be associated with a modular component of business intelligence analytics application 210. This association can be used to generate performance data, where the performance data is associated with the specific modular component of business intelligence analytics application 210, as is described below in greater detail.

Business intelligence analytics application 210 can transmit the one or more queries to search-analytical database engine 200. In certain embodiments, the one or more queries can be in a structured query language format. Search-analytical database engine 200 can then execute the one or more queries against the data stored within search-analytical database engine 200 to generate one or more results, where the one or more results includes data. Search-analytical database engine 200 can then transmit the one or more results to business intelligence analytics application 210. Business intelligence analytics application 210 can then display the one or more results to the user within a user interface.

According to the embodiment, search-analytical database engine 200 can log data associated with the one or more queries. In certain embodiments, the logging performed by search-analytical database engine 200 can be initiated by a user interacting with business intelligence analytics application 210 and setting a logging flag. According to the embodiment, search-analytical database engine 200 can provide two layers of logging. The first layer of logging is a layer of logging where search-analytical database engine 200 logs data associated with each query that business intelligence analytics application 210 transmits to search-analytical database engine 200. Such logged data can include a query arrival time, a query completion time, and the actual query itself. In certain embodiments, the query can be stored in an extensible markup language ("XML") format. The logged data can also include metadata associated with the query. The associated metadata can include a hypertext transfer protocol ("HTTP") header. The logged data can also include metadata that search-analytical database engine 200 computes for the query. The computed metadata can include statistics related to a percentage of data stores that were selected, attributes related to the data stores that were queried, and threads that were used to complete the query. As previously described, the data stored within search-analytical database engine 200 can be structured, semi-structured, or unstructured. Thus, the logged data can also be structured, semi-structured, or unstructured. Furthermore, depending on when in the query process the logging flag is set, one or more types of logged data can be generated. The logged data can be stored within search-analytical database engine 200. In certain embodiments, the logged data can be stored within one or more log files that are stored within search-analytical database engine 200.

The second layer of logging is a layer of logging where business intelligence analytics application 210 and search-analytical database engine 200, in combination, log data associated with the one or more queries, based on the modular component of business intelligence analytics application 210 that each query originates from. Thus, the second layer of logging is component-based logging. According to the embodiment, each individual modular component of business intelligence analytics application 210 can log activity that occurs within the respective modular component. For example, in an embodiment where business intelligence analytics application 210 includes a navigation component, a user can view and select one or more attributes (such as selecting one or more red-colored t-shirts) using the navigation component. Business intelligence analytics application 210 can identify a selection that the user makes using the navigation component, and a query that the navigation component transmits to search-analytical database engine 200 can be annotated with metadata generated by business intelligence analytics application 210. The metadata can include an identifier of a modular component, an identifier of a user session, or an identifier of an action. In combination with the first layer of logging, search-analytical database engine 200 can log the metadata generated by business intelligence analytics application 210, in addition to the other logged data described in relation to the first layer of logging. For example, business intelligence analytics application 210 can log that a user completes an action at time x. Business intelligence analytics application 210 can further log that it received the action at time x+1. Business intelligence analytics application 210 can further log that it sent a query associated with the action to search-analytical database engine 200 at time x+2. After a certain period of time where search-analytical database engine 200 processes the query, business intelligence analytics application 210 can further log that it received one or more results of the query from search-analytical database engine 200 at time x+10. At time x+11, business intelligence analytics application 210 can further log that it logged data associated with the one or more received results. At time x+12, business intelligence analytics application 210 can further log that it sent the one or more results of the query to a user interface. At time x+13, business intelligence analytics application 210 can further log that the one or more results of the query were displayed to the user within the user interface.

Thus, utilizing both layers of logging, one or more user events (such as a user clicking on a color attribute with a value of "red" within business intelligence analysis application 210) can be identified, and aggregated into a single representable structure. The logged data that is generated by the two layers of logging can then be analyzed, as is described below in greater detail. In certain embodiments, the logged data includes attributes, such as an HTTP exchange identity, a response size, one or more request time values, a number of results, a queue status, and a query body. In other embodiments, the logged data also includes data related to: which content elements were requested; selected refinements; record filters; search terms; record sorts; page size; offsets; refinement configuration (i.e., exposed dimensions); analytics statement templates; analytics group bys; and analytics sorts. In certain embodiments, where the logged data includes an HTTP header, the logged data can also include an identifier of a query, an identifier of a user session, and an identifier of a page view of a modular component.

According to the embodiment, the performance analysis system further includes a performance analysis application 220. In certain embodiments, performance analysis application 220 includes a performance analysis module (such as performance analysis module 16 of FIG. 1). Performance analysis application 220 is an application that can operably connect to search-analytical database engine 200, and that can analyze logged data that is stored within search-analytical database engine 200. In certain embodiments, logged data is stored within a separate instance of search-analytical database engine 200 (not shown in FIG. 2), and performance analysis application 220 analyzes the logged data that is stored within the separate instance of search-analytical database engine 200. Based on an analysis of the logged data, performance analysis application 220 can generate performance data, and store the performance data within search-analytical database engine 200 (or in certain embodiments, the separate instance of search-analytical database engine 200). Performance analysis application 220 can further generate and perform one or more performance queries of the performance data stored within search-analytical database engine 200 (or in certain embodiments, the separate instance of search-analytical database engine 200). The one or more performance queries can return one or more results that cause performance analysis application 220 to display performance data to one or more users of performance analysis application 220 within a user interface. In certain embodiments, where the logged data, and thus, the performance data, includes one or more queries originally executed against the data stored within search-analytical database engine 200, performance analysis application 220 can re-execute the one or more queries against the data stored within search-analytical database engine 200. In alternate embodiments, the performance analysis system can include additional performance analysis applications in addition to performance analysis application 220 (not shown in FIG. 2), where the additional business intelligence analytics applications provide identical or substantially similar functionality as performance analysis application 220.

According to the illustrated embodiment, performance analysis application 220 can analyze logged data that is stored within search-analytical database engine 200. More specifically, performance analysis application 220 can identify logged data stored within search-analytical database engine 200, and aggregate the logged data. For example, performance analysis application 220 can aggregate logged data by query, by action, by user session, or by modular component. Performance analysis application 220 can subsequently extract the aggregated logged data and instantiate one or more performance data records (also identified as performance data). Performance analysis application 220 can then store the aggregated logged data into the one or more performance data records (i.e., performance data), where the performance data can be stored within search-analytical database engine 200. The performance data allows performance analysis application 220 to provide one or more users performance analysis information regarding one or more queries that can be executed against search-analytical database engine 200. According to the embodiment, the performance data can include one or more performance metrics associated with one or more queries, where the one or more performance metrics can be aggregated by query, by action, by user session, or by modular component. Examples of performance metrics include query time, system utilization, system contention, percentage of system used, and content-oriented analysis (e.g., what content are users querying for). In certain embodiments, where the logged data includes one or more queries, the one or more queries can be included within the one or more performance data records (i.e., performance data).

According to the embodiment, one or more users of performance analysis application 220 can query performance data stored within search-analytical database engine 200 through one or more performance queries (also identified as performance summarizations). The one or more performance queries can be created by performance analysis application 220. Performance analysis application 220 can transmit the one or more performance queries to search-analytical database engine 200. In certain embodiments, the one or more performance queries can be in a structured query language format. Search-analytical database engine 200 can then execute the one or more performance queries against the performance data stored within search-analytical database engine 200 to generate one or more performance results, where the one or more performance results includes performance data. Search-analytical database engine 200 can then transmit the one or more performance results to performance analysis application 220. Performance analysis application 220 can then display the one or more performance results to the user within a user interface. In certain embodiments, performance analysis application 220 can utilize a user interface that is identical to the user interface of business intelligence analysis application 210.

For example, a user of performance analysis application 220 can generate one or more performance queries, such as: which queries of business intelligence analytics application 210 are the fastest queries; which queries of business intelligence analytical application 210 are the slowest queries; which modular components of business intelligence analytical application 210 produce the fastest queries; which modular components of business intelligence analytical application 210 produce the slowest queries; which attributes of the data stored within search-analytical database engine 200 are selected the most often; which attributes of the data stored within search-analytical database engine 200 are selected the least often; and whether the frequency of selection affect the time of query. Therefore, just like a business user can utilize business intelligence analytical application 210 to generate a query, such as "how many cars are being used for a specific vendor," a performance analysis user can utilize performance analysis application 220 to generate a performance query, such as "how many business intelligence analytical application instances are generating a query that runs for at least one hundred milliseconds."

In certain embodiments, where the performance data includes one or more queries, performance analysis application 220 can re-execute the one or more queries against search-analytical database engine 200. According to these embodiments, performance analysis application 220 can transmit the one or more queries to search-analytical database engine 200. In certain embodiments, the one or more queries can be in a structured query language format. Search-analytical database engine 200 can then execute the one or more queries against the data stored within search-analytical database engine 200 to generate one or more results, where the one or more results includes data. Search-analytical database engine 200 can then transmit the one or more results to performance analysis application 220. Thus, a user of performance analysis application 220 can receive far more information than the user would receive by simply querying the performance data, because the user can view the results from the actual query. For example, the user could receive information, such as number of dimensions and results returned and displayed, number of dimensions with refinements returned and displayed, and resources consumed during query processing.

FIG. 3 illustrates an example user interface 300 of a performance analysis system, according to an embodiment of the invention. User interface 300 displays performance data that can be queried by a performance analysis application (such as performance analysis application 220 of FIG. 2). For example, user interface 300 can display one or more performance results, where each performance result can include performance data, such as a command sequence, a session, a gesture type, a duration of a command, or a load time. Performance data can also include, for example, a record identifier, or a portlet type.

Figure 4:
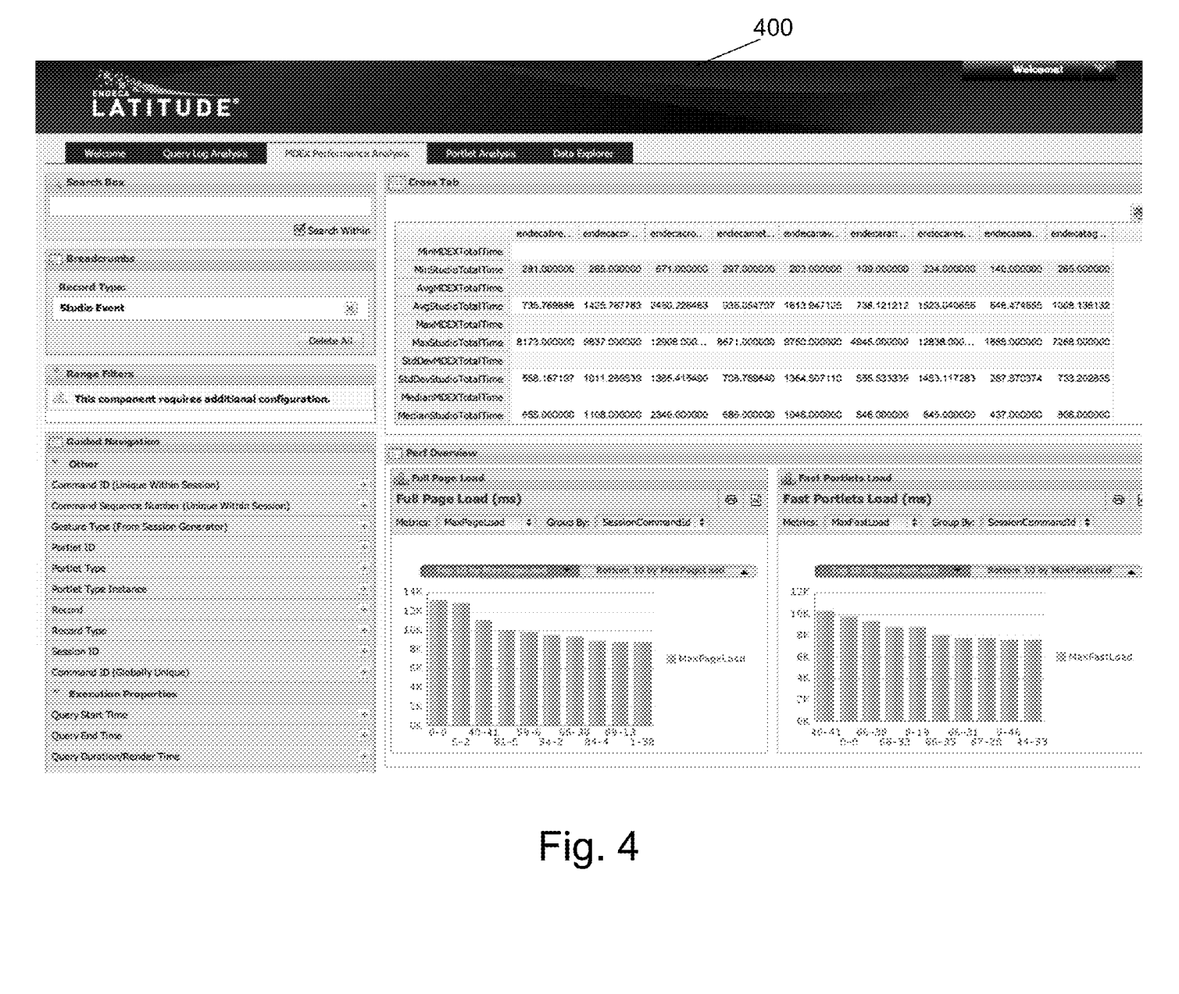
FIG. 4 illustrates another example user interface of a performance analysis system, according to another embodiment of the invention.

FIG. 4 illustrates another example user interface 400 of a performance analysis system, according to another embodiment of the invention. User interface 400 displays performance data that can be queried by a performance analysis application (such as performance analysis application 220 of FIG. 2). For example, user interface 400 can display one or more performance results, where each performance result can include performance data, such as performance metrics. Examples of performance metrics include query time, system utilization, system contention, percentage of system used, and content-oriented analysis (e.g., what content are users querying for).

Figure 5:
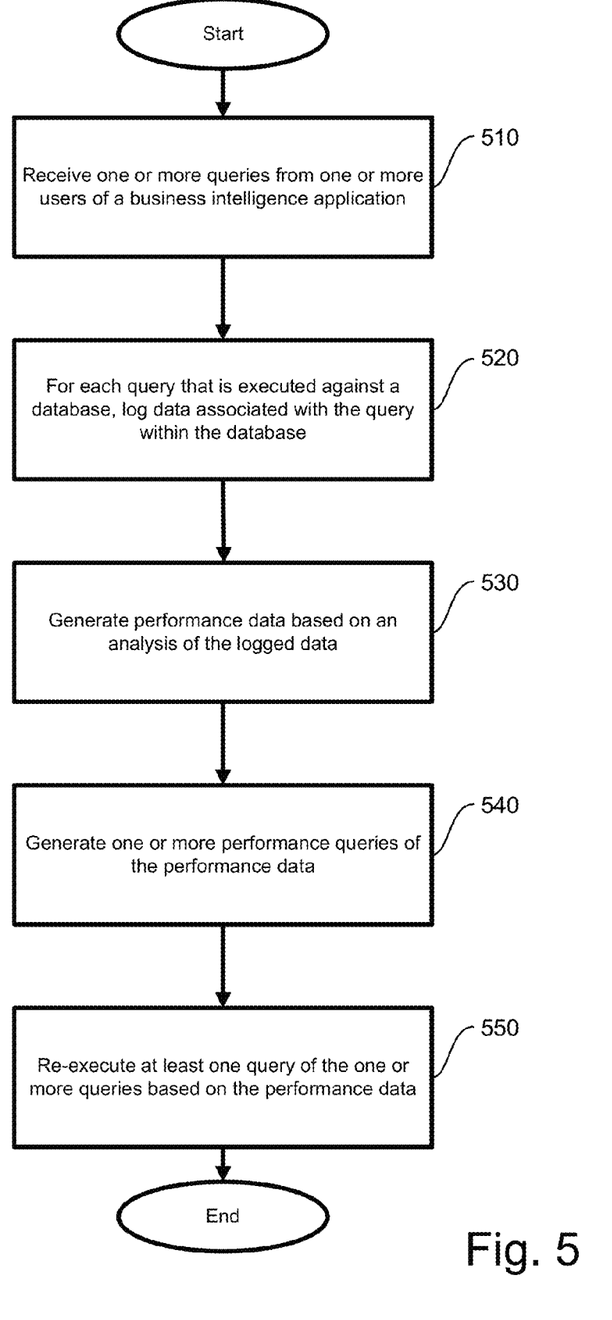
FIG. 5 illustrates a flow diagram of the functionality of a performance analysis module, according to an embodiment of the invention.

FIG. 5 illustrates a flow diagram of the functionality of a performance analysis module (such as performance analysis module 16 of FIG. 1), according to an embodiment of the invention. In one embodiment, the functionality of the flow diagram of FIG. 5, described below, is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 510. At 510, one or more queries are received from one or more users of a business intelligence analytics application. Each query can include a request for a plurality of attributes stored within a database, and a response to each query can include the plurality of attributes stored within the database. Each query can also be associated with a user of the business intelligence analytics application, a modular component of the business intelligence analytics application, and an action of the business intelligence analytics application. The database can be a hybrid search-analytical database. The hybrid-search analytical database can include a plurality of records, where each record includes its own self-describing schema. The flow then proceeds to 420.

At 520, for each query that is executed against the database, data associated with the query within the database is logged. The logged data can include the user of the business intelligence analytics application, the modular component of the business intelligence analytics application, and the action of the business intelligence analytics application. The logged data can be stored within the database. In alternate embodiments, the logged data can be stored in an alternate location, such as a log file. The logged data can further include at least one query of the one or more queries. The at least one query can be stored in an XML format. Further, the logged data can include, for each query of the at least one query, a query arrival time and a query completion time. The logged data can further include metadata associated with at least one query of the one or more queries. The metadata can include at least one of: a HTTP header, a percentage of data stores that were selected, one or more attributes related to the data stores, or one or more threads used to complete at least one query of the one or more queries. The flow then proceeds to 530.

At 530, performance data is generated based on an analysis of the logged data. The performance data can include data associated with one or more performance metrics of each query of the one or more queries. The performance data can be stored within the database. In alternate embodiments, the performance data can be stored in an alternate location, such as a second database. The performance data can include the user of the business intelligence analytics application, the modular component of the business intelligence analytics application, and the action of the business intelligence analytics application. The performance data can further include at least one query of the one or more queries. The at least one query can be stored in an XML format. Further, the performance data can include, for each query of the at least one query, a query arrival time and a query completion time. The performance data can be aggregated by at least one of, a query, a user of the business intelligence analytics application, a modular component of the business intelligence analytics application, and an action of the business intelligence analytics application. The performance metrics can include, for each query of the one or more queries, at least one of, query time, system utilization, system contention, percentage of system used, or query content. The flow then proceeds to 540.

At 540, one or more performance queries of the performance data is generated. A response to each performance query can include at least a portion of the one or more performance metrics stored within the database. The flow then proceeds to 550.

At 550, at least one of the one or more queries included within the performance data is re-executed against the database. The flow then ends.

Thus, according to an embodiment, a performance analysis application can provide a back-end guided navigation investigative analysis of performance data that is generated for a business intelligence analytical application. Such analysis allows results to be obtained such as: the distribution of number of exposed dimensions actually returned in query results during all guided navigations of a test scenario; whether there is an interesting relationship between query latency and number of queries processed concurrently; whether different "group by" operations are more expensive than others; whether more data is being returned to a business intelligence analytical application than is actually needed; and the number of the slowest 1% of queries that are analytics versus guided navigations.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to analyze a performance of a business intelligence analytics application, the instructions comprising:
   receiving one or more queries from a user of the business intelligence analytics application;
   generating, a response to each business intelligence analytics application query, wherein each response comprises a record from the intelligence analytics application that includes one or more attributes stored within a database, and wherein each query is associated with a user, a modular component, and an action;
   in response to the receipt of the one or more queries from the user, automatically:
      logging data associated with each of the one or more queries within the database, wherein the logged data comprises the user, the modular component, and the action;
      generating performance data based on an analysis of the logged data, wherein the performance data comprises data associated with one or more performance metrics of each query, and wherein the performance data is stored within one of the database or a second database;
      generating one or more performance queries of the performance data, wherein a response to each performance query comprises at least a portion of the one or more performance metrics stored within the database; and
      delivering the portion of the one or more performance metrics to the user.

2. The computer-readable medium of claim 1, wherein each of the logged data and the performance data further comprises at least one query of the one or more queries, the instructions further comprising:

re-executing at least one query of the one or more queries included within the performance data against the database; and
   providing additional performance data not previously presented in the portion of the one or more performance metrics.

3. The computer-readable medium of claim 2, wherein the at least one query is stored in an extensible markup language format.

4. The computer-readable medium of claim 2, wherein each of the logged data and the performance data further comprises, for each query of the at least one query, a query arrival time and a query completion time.

5. The computer-readable medium of claim 1, wherein the database comprises a hybrid search-analytical database.

6. The computer-readable medium of claim 5, wherein the hybrid search-analytical database comprises a plurality of records, and wherein each record comprises its own self-describing schema.

7. The computer-readable medium of claim 1, wherein the performance data is aggregated by at least one of: query, modular component, action, or user session.

8. The computer-readable medium of claim 1, wherein the one or more performance metrics comprise, for each query of the one or more queries, at least one of: query time, system utilization, system contention, percentage of system used, or query content.

9. The computer-readable medium of claim 1, wherein the logged data further comprises metadata associated with at least one query of the one or more queries.

10. The computer-readable medium of claim 9, wherein the metadata comprises at least one of: a hypertext transfer protocol header, a percentage of data stores that were selected, one or more attributes related to the data stores, or one or more threads used to complete at least one query of the one or more queries.

11. A computer-implemented method for analyzing a performance of a business intelligence analytics application, the computer-implemented method comprising:
   receiving one or more queries from a user of the business intelligence analytics application;
   generating a response to each business intelligence analytics application query, wherein each response comprises a record from the intelligence analytics application that includes one or more attributes stored within a database, and wherein each query is associated with a user, a modular component, and an action;
   logging data associated with each of the one or more queries within the database, wherein the logged data comprises the user, the modular component, and the action;
   in response to the receipt of the one or more queries from the user, automatically:
      generating performance data based on an analysis of the logged data, wherein the performance data comprises data associated with one or more performance metrics of each query, and wherein the performance data is stored within one of the database or a second database;
      generating one or more performance queries of the performance data, wherein a response to each performance query comprises at least a portion of the one or more performance metrics stored within the database; and
      delivering the portion of the one or more performance metrics to the user.

12. The computer-implemented method of claim 11, wherein each of the logged data and the performance data further comprises at least one query of the one or more queries, the method further comprising:
re-executing at least one query of the one or more queries included within the performance data against the database; and
providing additional performance data not previously generated.

13. The computer-implemented method of claim 11, wherein each of the logged data and the performance data further comprises, for each query of the at least one query, a query arrival time and a query completion time.

14. The computer-implemented method of claim 11, wherein the performance data is aggregated by at least one of: query, modular component, action, or user session.

15. The computer-implemented method of claim 11, wherein the one or more performance metrics comprise, for each query of the one or more queries, at least one of: query time, system utilization, system contention, percentage of system used, or query content.

16. A performance analysis system, comprising:
a processor;
a query receiving module configured to receive one or more queries from a user of the business intelligence analytics application, that generates a response to each business intelligence analytics application query, wherein each response comprises a record from the intelligence analytics application that includes one or more attributes stored within a database, and wherein each query is associated with a user, a modular component, and an action;
a logging module configured to log in response to the receipt of the one or more queries from the user, data associated with each of the one or more queries within the database, wherein the logged data comprises the user, the modular component, and the action;
a performance module configured to generate, in response to the receipt of the one or more queries from the user, performance data based on an analysis of the logged data, wherein the performance data comprises data associated with one or more performance metrics of each query, and wherein the performance data is stored within one of the database or a second database;
a performance query module configured to generate, in response to the receipt of the one or more queries from the user, one or more performance queries of the performance data, wherein a response to each performance query comprises at least a portion of the one or more performance metrics stored within the database; and
delivering the portion of the one or more performance metrics to the user.

17. The performance analysis system of claim 16, wherein each of the logged data and the performance data further comprises at least one query of the one or more queries, the performance analysis system further comprising:
a query execution module configured to re-execute at least one query of the one or more queries included within the performance data against the database and to provide additional performance data not previously generated.

18. The performance analysis system of claim 16, wherein each of the logged data and the performance data further comprises, for each query of the at least one query, a query arrival time and a query completion time.

19. The performance analysis system of claim 16, wherein the performance data is aggregated by at least one of: query, modular component, action, or user session.

20. The performance analysis system of claim 16, wherein the one or more performance metrics comprise, for each query of the one or more queries, at least one of: query time, system utilization, system contention, percentage of system used, or query content.

* * * * *

UNITED STATES PATENT AND TRADEMARK OFFICE
CERTIFICATE OF CORRECTION

PATENT NO. : 9,183,529 B2  
APPLICATION NO. : 13/564192  
DATED : November 10, 2015  
INVENTOR(S) : Gluzman Peregrine et al.

Page 1 of 1

It is certified that error appears in the above-identified patent and that said Letters Patent is hereby corrected as shown below:

On Title Page, item (75) column 1, under Inventors, lines 1-2, delete "Chesnut Hill, MA" and insert -- Chestnut Hill, MA --, therefor.

In the Claims

In column 13, line 39, in claim 1, delete "generating," and insert -- generating --, therefor.

Signed and Sealed this  
Twenty-eighth Day of June, 2016

Michelle K. Lee  
*Director of the United States Patent and Trademark Office*